US012032507B1

United States Patent
Huang et al.

(10) Patent No.: US 12,032,507 B1
(45) Date of Patent: Jul. 9, 2024

(54) MANAGING PERIPHERAL COMPONENT INTERCONNECT EXPRESS SLOTS OF AN INFORMATION HANDLING SYSTEM

(71) Applicant: Dell Products L.P., Round Rock, TX (US)

(72) Inventors: Ting-Chiang Huang, New Taipei (TW); Tung-Yi Chen, New Taipei (TW); Po-I Huang, New Taipei (TW); Shu-Yu Jiang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/164,746

(22) Filed: Feb. 6, 2023

(51) Int. Cl.
G06F 13/42 (2006.01)
G06F 1/26 (2006.01)

(52) U.S. Cl.
CPC .......... *G06F 13/4221* (2013.01); *G06F 1/266* (2013.01); *G06F 2213/0026* (2013.01)

(58) Field of Classification Search
CPC ................. G06F 13/4221; G06F 1/266; G06F 2213/0026
See application file for complete search history.

(56) References Cited

U.S. PATENT DOCUMENTS

| | | | |
|---|---|---|---|
| 2003/0093721 A1* | 5/2003 | King | G11B 25/043 714/42 |
| 2003/0218842 A1* | 11/2003 | Jung-Hui | G06F 13/4081 361/90 |
| 2004/0215985 A1* | 10/2004 | Armstrong | G06F 1/3203 713/300 |
| 2007/0271404 A1* | 11/2007 | Dearth | G06F 13/4081 718/100 |
| 2008/0005377 A1* | 1/2008 | Lambert | G06F 11/0727 710/15 |
| 2010/0106987 A1* | 4/2010 | Lambert | G06F 1/3203 713/320 |

* cited by examiner

*Primary Examiner* — Nimesh G Patel
(74) *Attorney, Agent, or Firm* — McDermott Will & Emery LLP

(57) ABSTRACT

Managing PCIe slots, including identifying a table, stored at a database, indicating, for each PCIe card, a number of PCIe slots to be designated as inaccessible to other PCIe cards; detecting coupling of a particular PCIe card to a particular PCIe slot; accessing, in response to detecting the coupling of the particular PCIe card to the particular PCIe slot, the table; determining, based on the accessing, that the table includes data indicating the particular PCIe card; identifying, based on determining that the table includes data indicating the particular PCIe card, the number of PCIe slots adjacent to the particular slot to be designated as inaccessible to other PCIe cards; adjusting, based on the number of PCIe slots adjacent to the particular slot to be designated as inaccessible to other PCIe cards, a power state of one or more PCIe slots adjacent to the particular PCIe slot to an off-power state.

20 Claims, 6 Drawing Sheets

MANAGING PERIPHERAL COMPONENT INTERCONNECT EXPRESS SLOTS OF AN INFORMATION HANDLING SYSTEM

BACKGROUND

Field of the Disclosure

The disclosure relates generally to an information handling system, and in particular, managing peripheral component interconnect express slots of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To prevent incorrect PCIe card installation and unexpected slot sequence at an information handling system, PCIe slots can be covered by a filler. However, doing such can still provide potential risk of the user adding or reinstalling add-on cards and removing the slot filler, resulting in degraded system thermal and performance issues.

SUMMARY

Innovative aspects of the subject matter described in this specification may be embodied in a method of managing peripheral component interconnect express (PCIe) slots of an information handling system, including identifying a table, stored at a database, indicating, for each PCIe card of a plurality of PCIe cards, a number of PCIe slots to be designated as inaccessible to other PCIe cards; detecting coupling of a particular PCIe card to a particular PCIe slot of the PCIe slots of the information handling system; accessing, in response to detecting the coupling of the particular PCIe card to the particular PCIe slot, the table; determining, based on the accessing, that the table includes data indicating the particular PCIe card; identifying, based on determining that the table includes data indicating the particular PCIe card, the number of PCIe slots adjacent to the particular slot to be designated as inaccessible to other PCIe cards; and adjusting, based on the number of PCIe slots adjacent to the particular slot to be designated as inaccessible to other PCIe cards, a power state of one or more PCIe slots adjacent to the particular PCIe slot to an off-power state.

Other embodiments of these aspects include corresponding systems, apparatus, and computer programs, configured to perform the actions of the methods, encoded on computer storage devices.

These and other embodiments may each optionally include one or more of the following features. For instance, determining, based on the accessing, that the table does not include data indicating the particular PCIe card; and initializing, based on determining that the table does not includes data indicating the particular PCIe card, the particular PCIe card. After adjusting the power state of the one or more PCIe slots, detecting a status of each of the one or more PCIe slots; determining, based on detecting the status of each of the one or more PCIe slots, that a first PCIe slot of the one or more PCIe slots is coupled to a first PCIe card; and in response to determining that the first PCIe slot is coupled to the first PCIe card, providing a warning indicator at the information handling system. The warning indicator is an audio notification provided by speakers of the information handling system. The warning indicator is a visual notification provided at a display device of the information handling system. After adjusting the power state of the one or more PCIe slots, detecting a status of each of the one or more PCIe slots; determining, based on detecting the status of each of the one or more PCIe slots, that each of the one or more PCIe slots are not coupled to a PCIe slot; in response to determining that each of the one or more PCIe slots are not coupled to a PCIe slot, initializing the particular PCIe card. Adjusting the power state further includes adjusting the power state of two or more PCIe slots adjacent to the particular PCIe slot to the off-power state. Determining that a setting associated with the PCIe slots is set to indicate that the PCIe slots are able to be designated as inaccessible; and in response to determining that the setting associated with the PCIe slots indicates that the PCIe slots are able to be designated as inaccessible, detecting coupling of the particular PCIe card to the particular PCIe slot of the PCIe slots of the information handling system. Determining that a setting associated with the PCIe slots is not set to indicate that the PCIe slots are not able to be designated as inaccessible; and in response to determining that the setting associated with the PCIe slots is not set to indicate that the PCIe slots are not able to be designated as inaccessible, initializing the particular PCIe card.

Particular implementations of the subject matter described in this specification can be implemented so as to realize one or more of the following advantages. For example, thermal and system performance of the information handling system is improved.

The details of one or more embodiments of the subject matter described in this specification are set forth in the accompanying drawings and the description below. Other potential features, aspects, and advantages of the subject matter will become apparent from the description, the drawings, and the claims.

Figure 1:
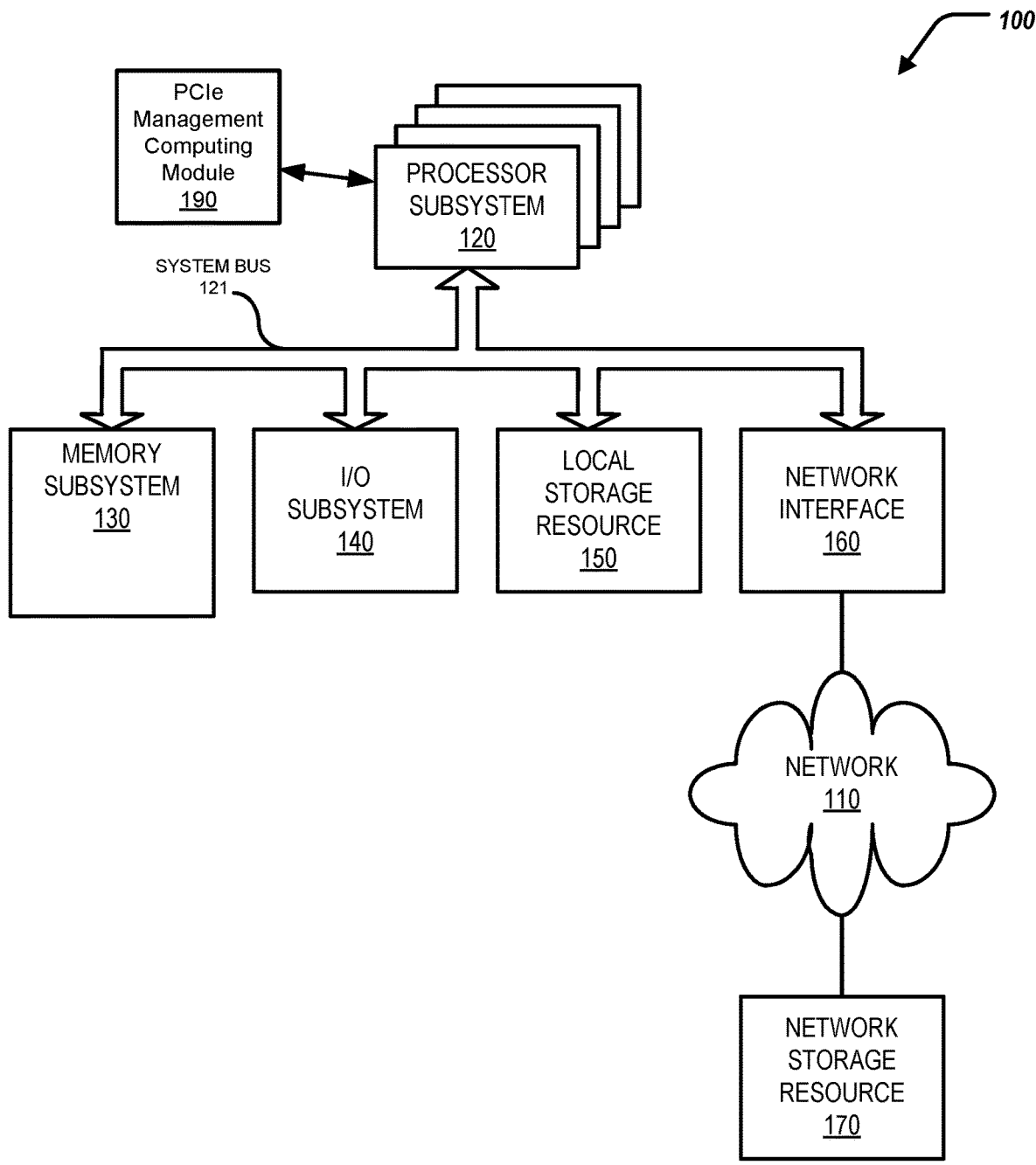
FIG. 1 is a block diagram of selected elements of an embodiment of an information handling system.

DESCRIPTION OF PARTICULAR
EMBODIMENT(S)

This disclosure discusses methods and systems for managing peripheral component interconnect express slots of an information handling system. In short, a power state of PCIe slots of the information handling system can be managed. For example, when it is detected that one or more PCIe slots should be inaccessible (clearance), the power state of such PCIe slots is changed to an off power state. A warning can be provided when there is an attempt to install a PCIe card at a PCIe slot that is powered off.

Specifically, this disclosure discusses a system and a method for managing peripheral component interconnect express (PCIe) slots of an information handling system, including identifying a table, stored at a database, indicating, for each PCIe card of a plurality of PCIe cards, a number of PCIe slots to be designated as inaccessible to other PCIe cards; detecting coupling of a particular PCIe card to a particular PCIe slot of the PCIe slots of the information handling system; accessing, in response to detecting the coupling of the particular PCIe card to the particular PCIe slot, the table; determining, based on the accessing, that the table includes data indicating the particular PCIe card; identifying, based on determining that the table includes data indicating the particular PCIe card, the number of PCIe slots adjacent to the particular slot to be designated as inaccessible to other PCIe cards; and adjusting, based on the number of PCIe slots adjacent to the particular slot to be designated as inaccessible to other PCIe cards, a power state of one or more PCIe slots adjacent to the particular PCIe slot to an off-power state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a PCIe management computing module 190. The PCIe management computing module 190 can be coupled to, or included by the processor subsystem 120. The PCIe management computing module 190 can be included by an enclosure controller (EC).

In short, the PCIe management computing module 190 can facilitate controlling a power state of PCIe slots of the information handling system 100. For example, when the PCIe management computing module 190 detects that one or more PCIe slots should be inaccessible (clearance), the PCIe management computing module 190 adjusts the power state of such PCIe slots to an off power state. The PCIe management computing module 190 can additionally provide a warning when there is an attempt to install a PCIe card at a PCIe slot that is powered off.

Figure 2:
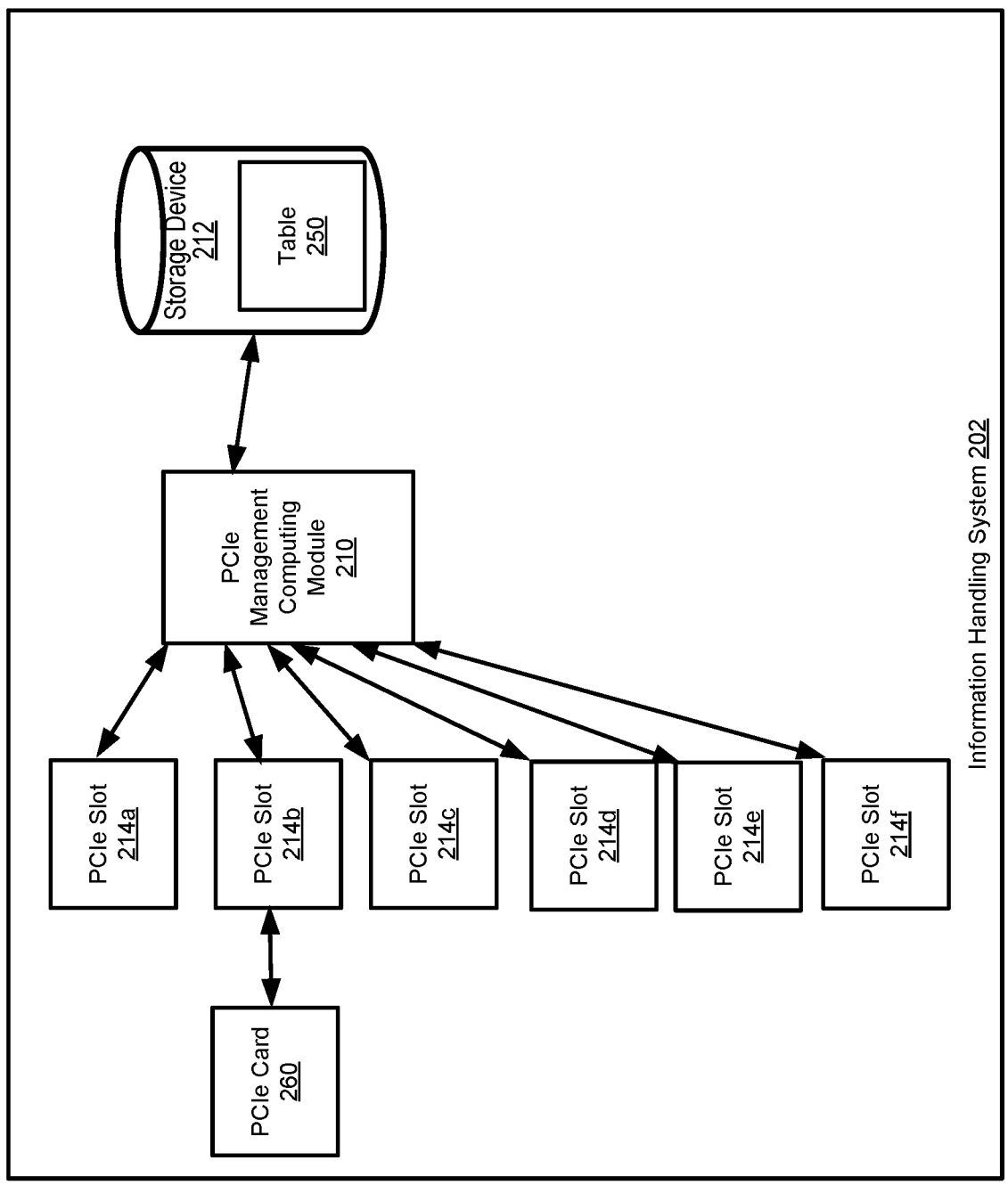
FIG. 2 illustrates a block diagram of an information handling system for managing peripheral component interconnect express slots.

Turning to FIG. 2, FIG. 2 illustrates an environment 200 including an information handling system 202. The information handling system 202 can include a peripheral component interconnect express (PCIe) management computing module 210, a storage device 212, and PCIe slots 214a, 214b, 214c, 214d, 214e, 214f (collectively referred to as PCIe slots 214). However, the information handling system 202 can include any number of PCIe slots 214. In some examples, the information handling system 202 is similar to, or includes, the information handling system 100 of FIG. 1. In some examples, the PCIe management computing module 210 is the same, or substantially the same, as the PCIe management computing module 190 of FIG. 1.

The PCIe management computing module 210 can be in communication with the storage device 212 and the PCIe slots 214.

Figure 3:
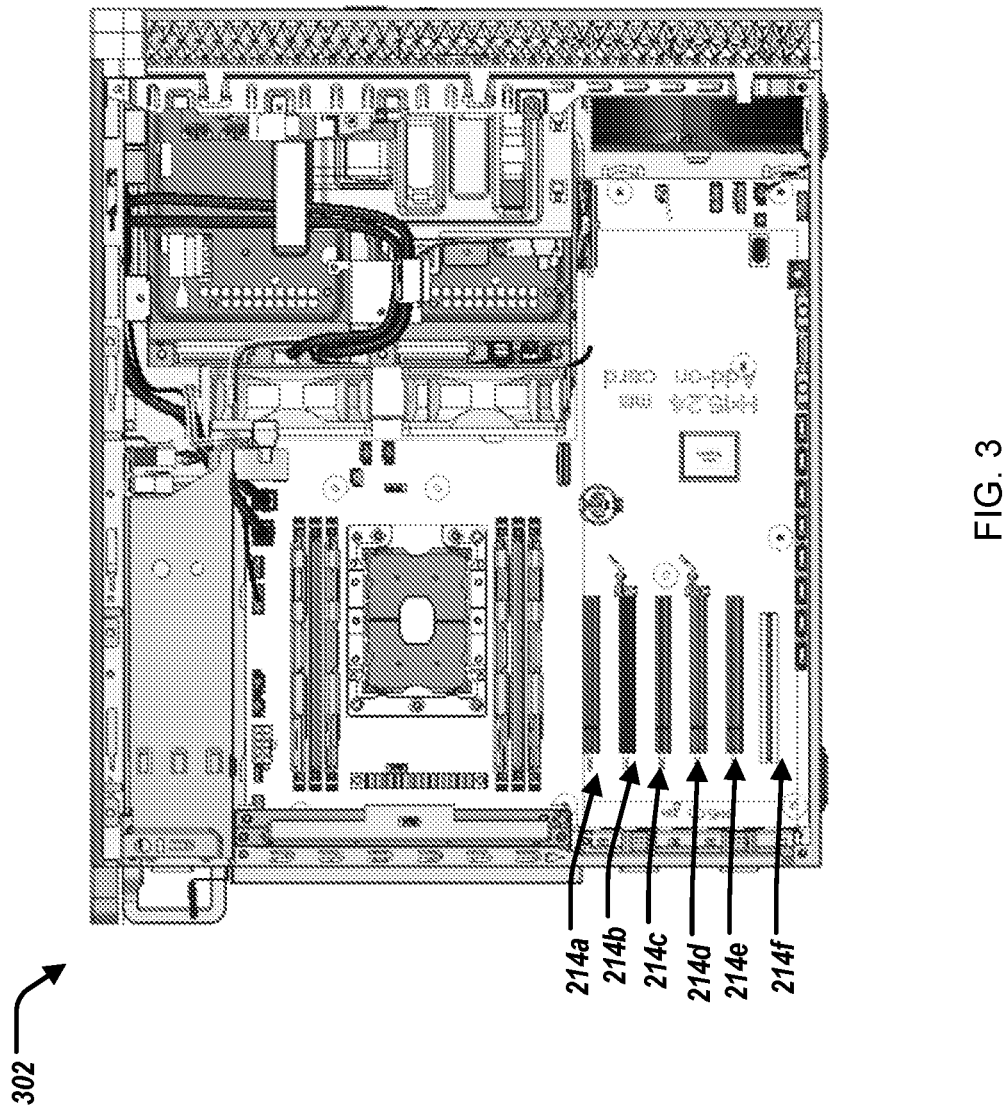
FIG. 3 illustrates a top down view of a motherboard of the information handling system including the peripheral component interconnect express slots.

FIG. 3 illustrates a top down view of a motherboard 302 of the information handling system 202. The motherboard 302 can include the PCIe slots 214.

Figure 4:
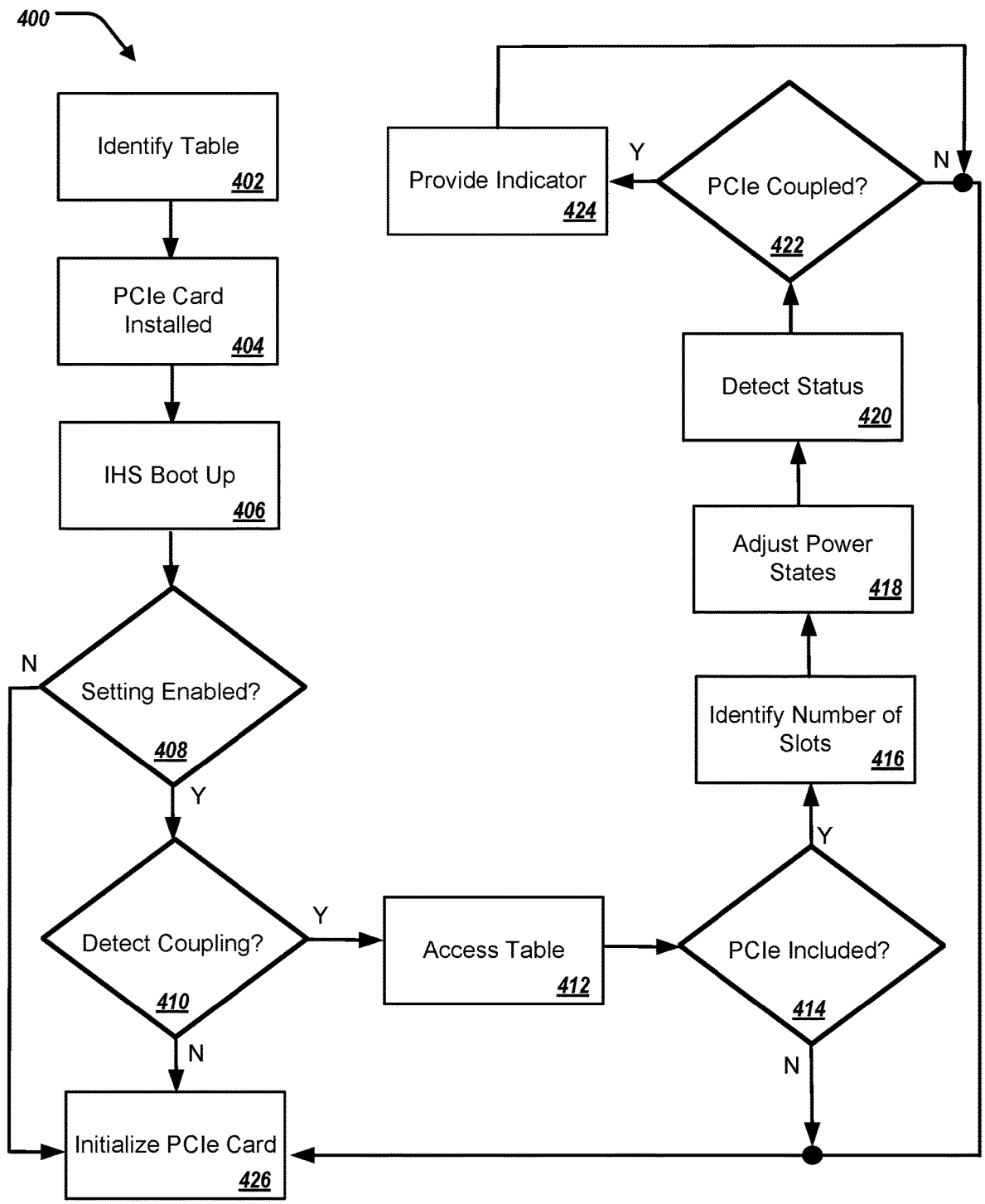
FIGS. 4, 5 illustrate methods for managing peripheral component interconnect express slots.

FIG. 4 illustrates a flowchart depicting selected elements of an embodiment of a method 400 for managing the PCIe slots 214. The method 400 may be performed by the information handling system 100, the information handling system 202, and/or the PCIe management computing module 210, and with reference to FIGS. 1-3. It is noted that certain operations described in method 400 may be optional or may be rearranged in different embodiments.

Figure 6:
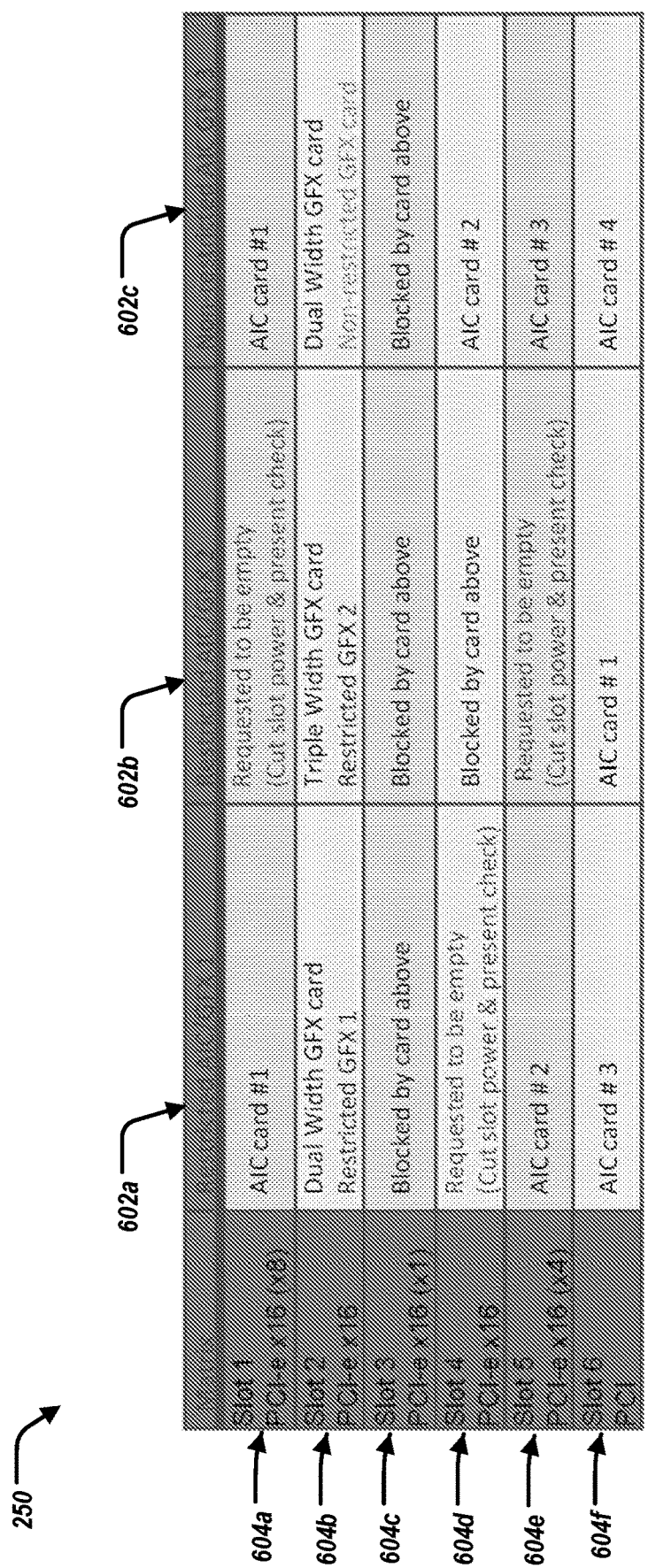
FIG. 6 illustrates a table for managing peripheral component interconnect express slots.

The PCIe management computing module 210 identifies a table 250 stored by the storage device 212 (or database 212), at 402. The table 250 can indicate, for each PCIe card of a plurality of PCIe cards, a number of PCIe slots 214 to be designated as inaccessible to other PCIe cards. FIG. 6 illustrates an example of the table 250. The table 250 can include columns 602a, 602b, 602c each associated with a PCIe card (or type of PCIe card). The table 250 can include rows 604a, 604b, 604c, 604d, 604e, 606f each associated with one of the PCIe slots 214. For example, for a PCIe card indicated as "restricted AIC/GFX 1" by column 602a, the row 604d indicates that PCIe slot 214d is to be inaccessible. For example, for a PCIe card indicated as "restricted AIC/GFX 2" by column 602b, the row 604a indicates that PCIe slot 214a is to be inaccessible and the row 604e indicates that PCIe slot 214e is to be inaccessible. For example, for a PCIe card indicated as "non-restricted AIC/GFX 3" by column 602c, none of the rows indicate that any of the PCIe slots 214 are to be inaccessible.

A PCIe card 260, shown in FIG. 2, can be installed at (coupled with) PCIe slot 214b, at 404. For example, a user of the information handling system 204 can install (or couple) the PCIe card 260 with the PCIe slot 214b.

The information handling system 204 is booted up, at 406. That is, the power state of the information handling system 204 is changed to an on-power state.

The PCIe management computing module 210 determines whether a setting associated the PCIe slots 214 is set that indicates whether the PCIe slots 214 are able to be designated as inaccessible, at 408. For example, the user of the information handling system 202 can indicate, via interaction with the information handling system 202, whether to enable or disable such a setting (e.g., "smart power off feature").

The PCIe management computing module 210 can determine that the setting associated the PCIe slots 214 is set that indicates that the PCIe slots 214 are able to be designated as inaccessible (at 408), and in response to such, detect possible coupling of any PCIe cards to any of the PCIe slots 214, at 410. The PCIe management computing module 210 can detect that the PCIe card 260 is coupled to the PCIe slot 214b, at 410.

The PCIe management computing module 210 can access, in response to detecting the coupling of the PCIe card 260 to the PCIe slot 214b, the table 250, at 412. That is, the PCIe management computing module 210, in communication with the storage device 212, access the table 250 through the storage device 212.

The PCIe management computing module 210 determines, based on the accessing, whether the table 250 includes data indicating the PCIe card 260, at 412. In some examples, the PCIe management computing module 210 determines that the table 250 includes data indicating the PCIe card 260. For example, the PCIe card 260 can be indicated by column 602a or 602b.

The PCIe management computing module 210 identifies, based on determining that the table 250 includes data indicating the PCIe card 260, a number of PCIe slots 214 adjacent to the PCIe slot 214b to be designated as inaccessible to other PCIe cards, at 416. For example, the table 250 can indicate for the PCIe card 260, that at least one adjacent PCIe slot 214 is to be inaccessible to other PCIe cards. For example, the table 250 can indicate for the PCIe card 260, that at least two adjacent PCIe slots 214 is to be inaccessible to other PCIe cards.

The PCIe management computing module 210 adjusts, based on the number of PCIe slots adjacent to the PCIe slot 214b to be designated as inaccessible to other PCIe cards, a power state of one or more PCIe slots 214 adjacent to the PCIe slot 214b to an off-power state, at 418. For example, when the table 250 indicates that one adjacent PCIe slot 214 is to be inaccessible to other PCIe cards, the PCIe management computing module 210 adjusts the power state of the PCIe slot 214a or PCIe slot 214c to an off-power state. For example, when the table 250 indicates that two adjacent PCIe slots 214 are to be inaccessible to other PCIe cards, the PCIe management computing module 210 adjusts the power state of the PCIe slot 214a and PCIe slot 214c to an off power state.

The PCIe management computing module 210, after adjusting the power state of one or more of the PCIe slots 214, detects a status of each of the PCIe slots 214, at 420. Detecting the status of each of the PCIe slots 214 can include determining whether PCIe cards are coupled to the PCIe slots 214.

In some examples, the PCIe management computing module 210 can determine, based on detecting the status of the PCIe slots 214, that PCIe slot 214a is coupled to a PCIe card, at 422. That is, when the PCIe slot 214a is in an off-power state, the PCIe management computing module 210 determines that a PCIe card (not shown) is coupled to the PCIe slot 214a. For example, the PCIe management computing module 210 can utilize slot PRSNT #pin detection to determine whether a PCIe card is coupled to a PCIe slot 214a. When the PRSNT #=0, a PCIe card is coupled to the PCIe slot 214a.

The PCIe management computing module 210, in response to determining that a PCIe card is coupled to the PCIe slot 214a, provides a warning indicator at the information handling system 202, at 424. In some examples, the warning indicator can be an audio notification provided by speakers of the information handling system 202. In some examples, the warning indicator can be a visual notification provided at a display device of the information handling system 202. For example, a visual notification can indicate such text as "The power of the PCIe slot is turned off." Once the PCIe card is removed from the PCIe slot 214a (e.g., by the user), the PCIe management computing module 210 initializes the PCI card 260, at 426. For example, the PCIe management computing module 210 initializes the PCIe card 260 for use at the information handling system 202.

In some examples, the PCIe management computing module 210 can determine, based on detecting the status of the PCIe slots 214, that PCIe slot 214a is not coupled to a PCIe card, at 422. That is, when the PCIe slot 214a is in an off-power state, the PCIe management computing module 210 determines that a PCIe card is not coupled to the PCIe slot 214a. For example, the PCIe management computing module 210 can utilize slot PRSNT #pin detection to determine whether a PCIe card is coupled to a PCIe slot 214a. When the PRSNT #=1, a PCIe card is not coupled to the PCIe slot 214a.

The PCIe management computing module 210, in response to determining that a PCIe card is not coupled to the PCIe slot 214a, initializes the PCI card 260, at 426. For example, the PCIe management computing module 210 initializes the PCIe card 260 for use at the information handling system 202.

In some examples, the PCIe management computing module 210 can determine that the setting associated the PCIe slots 214 is not set that indicates whether the PCIe slots 214 are able to be designated as inaccessible (at 408), and in response to such, initializes the PCIe card 260, at 426.

In some examples, the PCIe management computing module 210 determines that the table 250 does not includes data indicating the PCIe card 260 (at 414), and in response, initializes the PCIe card 260, at 426.

In some examples, the PCIe management computing module 210 can detect that a PCIe card is not coupled to the PCIe slot 214a (at 410), and in response, initialize the PCIe card 260, at 426.

Figure 5:
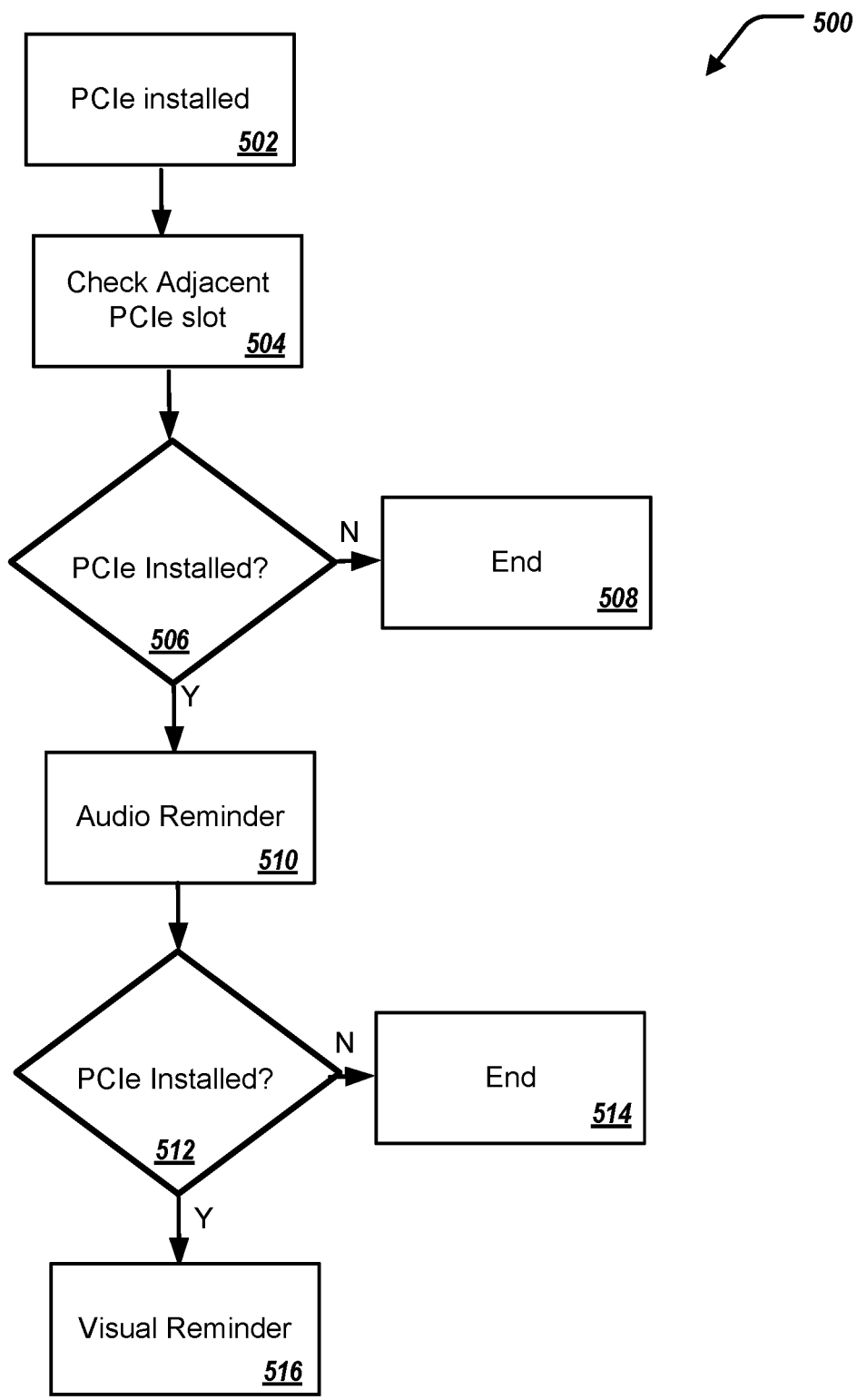

FIG. 5 illustrates a flowchart depicting selected elements of an embodiment of a method 500 for managing the PCIe slots 214. The method 500 may be performed by the information handling system 100, the information handling system 202, and/or the PCIe management computing module 210, and with reference to FIGS. 1-3. It is noted that certain operations described in method 500 may be optional or may be rearranged in different embodiments.

The PCIe card 260, shown in FIG. 2, can be installed (coupled with) the PCIe slot 214b, at 502. For example, a user of the information handling system 204 can install (or couple) the PCIe card 260 with the PCIe slot 214b.

The PCIe management computing module 210 detects coupling of PCIe cards installed at adjacent PCIe slots to the PCIe slot 214b, at 504. For example, the PCIe management computing module 210 detects coupling of a PCIe card to the PCIe slot 214a or the PCIe slot 214c.

The PCIe management computing module 210 determines, based on the detecting, whether a PCIe card is coupled to the PCIe slot 214a or the PCIe slot 214c, at 506. When the PCIe management computing module 210 determines that no PCIe card is coupled to the PCIe slot 214a or the PCIe slot 214c, the process ends, at 508. When the PCIe management computing module 210 determines that a PCIe card is coupled to either one of the PCIe slot 214a or the PCIe slot 214c, the PCIe management computing module 210 provides an audio reminder, at 510. In some examples, the warning indicator can be an audio notification provided by speakers of the information handling system 202.

After the PCIe management computing module 210 provides the audio reminder, the PCIe management computing module 210 determines, based on the detecting, whether a PCIe card is coupled to the PCIe slot 214a or the PCIe slot 214c, at 512. When the PCIe management computing module 210 determines that no PCIe card is coupled to the PCIe slot 214a or the PCIe slot 214c, the process ends, at 514. When the PCIe management computing module 210 determines that a PCIe card is coupled to either one of the PCIe slot 214a or the PCIe slot 214c, the PCIe management computing module 210 provides a visual reminder, at 516. In some examples, the warning indicator can be a visual notification provided at a display device of the information handling system 202.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of managing peripheral component interconnect express (PCIe) slots of an information handling system, comprising:
   identifying a table, stored at a database, indicating, for each PCIe card of a plurality of PCIe cards, a number of PCIe slots to be designated as inaccessible to other PCIe cards;
   detecting coupling of a particular PCIe card to a particular PCIe slot of the PCIe slots of the information handling system;
   accessing, in response to detecting the coupling of the particular PCIe card to the particular PCIe slot, the table;
   determining, based on the accessing, that the table includes data indicating the particular PCIe card;
   identifying, based on determining that the table includes data indicating the particular PCIe card, the number of PCIe slots adjacent to the particular slot to be designated as inaccessible to other PCIe cards; and
   adjusting, based on the number of PCIe slots adjacent to the particular slot to be designated as inaccessible to other PCIe cards, a power state of one or more PCIe slots adjacent to the particular PCIe slot to an off-power state.

2. The method of claim 1, further comprising:
   determining, based on the accessing, that the table does not include data indicating the particular PCIe card; and
   initializing, based on determining that the table does not includes data indicating the particular PCIe card, the particular PCIe card.

3. The method of claim 1, further comprising:
   after adjusting the power state of the one or more PCIe slots, detecting a status of each of the one or more PCIe slots;
   determining, based on detecting the status of each of the one or more PCIe slots, that a first PCIe slot of the one or more PCIe slots is coupled to a first PCIe card; and
   in response to determining that the first PCIe slot is coupled to the first PCIe card, providing a warning indicator at the information handling system.

4. The method of claim 3, wherein the warning indicator is an audio notification provided by speakers of the information handling system.

5. The method of claim 3, wherein the warning indicator is a visual notification provided at a display device of the information handling system.

6. The method of claim 1, further comprising:
after adjusting the power state of the one or more PCIe slots, detecting a status of each of the one or more PCIe slots;
determining, based on detecting the status of each of the one or more PCIe slots, that each of the one or more PCIe slots are not coupled to a PCIe slot;
in response to determining that each of the one or more PCIe slots are not coupled to a PCIe slot, initializing the particular PCIe card.

7. The method of claim 1, wherein adjusting the power state further includes adjusting the power state of two or more PCIe slots adjacent to the particular PCIe slot to the off-power state.

8. The method of claim 1, further comprising:
determining that a setting associated with the PCIe slots is set to indicate that the PCIe slots are able to be designated as inaccessible; and
in response to determining that the setting associated with the PCIe slots indicates that the PCIe slots are able to be designated as inaccessible, detecting coupling of the particular PCIe card to the particular PCIe slot of the PCIe slots of the information handling system.

9. The method of claim 1, further comprising:
determining that a setting associated with the PCIe slots is not set to indicate that the PCIe slots are not able to be designated as inaccessible; and
in response to determining that the setting associated with the PCIe slots is not set to indicate that the PCIe slots are not able to be designated as inaccessible, initializing the particular PCIe card.

10. An information handling system comprising a processor having access to memory media storing instructions executable by the processor to perform operations, comprising:
identifying a table, stored at a database, indicating, for each peripheral component interconnect express (PCIe) card of a plurality of PCIe cards, a number of PCIe slots to be designated as inaccessible to other PCIe cards;
detecting coupling of a particular PCIe card to a particular PCIe slot of the PCIe slots of the information handling system;
accessing, in response to detecting the coupling of the particular PCIe card to the particular PCIe slot, the table;
determining, based on the accessing, that the table includes data indicating the particular PCIe card;
identifying, based on determining that the table includes data indicating the particular PCIe card, the number of PCIe slots adjacent to the particular slot to be designated as inaccessible to other PCIe cards; and
adjusting, based on the number of PCIe slots adjacent to the particular slot to be designated as inaccessible to other PCIe cards, a power state of one or more PCIe slots adjacent to the particular PCIe slot to an off-power state.

11. The information handling system of claim 10, the operations further comprising:
determining, based on the accessing, that the table does not include data indicating the particular PCIe card; and
initializing, based on determining that the table does not includes data indicating the particular PCIe card, the particular PCIe card.

12. The information handling system of claim 10, the operations further comprising:
after adjusting the power state of the one or more PCIe slots, detecting a status of each of the one or more PCIe slots;
determining, based on detecting the status of each of the one or more PCIe slots, that a first PCIe slot of the one or more PCIe slots is coupled to a first PCIe card; and
in response to determining that the first PCIe slot is coupled to the first PCIe card, providing a warning indicator at the information handling system.

13. The information handling system of claim 12, wherein the warning indicator is an audio notification provided by speakers of the information handling system.

14. The information handling system of claim 12, wherein the warning indicator is a visual notification provided at a display device of the information handling system.

15. The information handling system of claim 10, the operations further comprising:
after adjusting the power state of the one or more PCIe slots, detecting a status of each of the one or more PCIe slots;
determining, based on detecting the status of each of the one or more PCIe slots, that each of the one or more PCIe slots are not coupled to a PCIe slot;
in response to determining that each of the one or more PCIe slots are not coupled to a PCIe slot, initializing the particular PCIe card.

16. The information handling system of claim 10, wherein adjusting the power state further includes adjusting the power state of two or more PCIe slots adjacent to the particular PCIe slot to the off-power state.

17. The information handling system of claim 10, the operations further comprising:
determining that a setting associated with the PCIe slots is set to indicate that the PCIe slots are able to be designated as inaccessible; and
in response to determining that the setting associated with the PCIe slots indicates that the PCIe slots are able to be designated as inaccessible, detecting coupling of the particular PCIe card to the particular PCIe slot of the PCIe slots of the information handling system.

18. The information handling system of claim 10, the operations further comprising:
determining that a setting associated with the PCIe slots is not set to indicate that the PCIe slots are not able to be designated as inaccessible; and
in response to determining that the setting associated with the PCIe slots is not set to indicate that the PCIe slots are not able to be designated as inaccessible, initializing the particular PCIe card.

19. A non-transitory computer-readable medium storing software comprising instructions executable by one or more computers which, upon such execution, cause the one or more computers to perform operations comprising:
identifying a table, stored at a database, indicating, for each peripheral component interconnect express (PCIe) card of a plurality of PCIe cards, a number of PCIe slots to be designated as inaccessible to other PCIe cards;
detecting coupling of a particular PCIe card to a particular PCIe slot of the PCIe slots of the information handling system;
accessing, in response to detecting the coupling of the particular PCIe card to the particular PCIe slot, the table;
determining, based on the accessing, that the table includes data indicating the particular PCIe card;
identifying, based on determining that the table includes data indicating the particular PCIe card, the number of PCIe slots adjacent to the particular slot to be designated as inaccessible to other PCIe cards; and adjusting, based on the number of PCIe slots adjacent to the particular slot to be designated as inaccessible to other PCIe cards, a power state of one or more PCIe slots adjacent to the particular PCIe slot to an off-power state.

20. The non-transitory computer-readable medium of claim 19, the operations further comprising:

determining, based on the accessing, that the table does not include data indicating the particular PCIe card; and initializing, based on determining that the table does not includes data indicating the particular PCIe card, the particular PCIe card.

* * * * *